United States Patent [19]

Sauer

[11] Patent Number: 4,635,973
[45] Date of Patent: Jan. 13, 1987

[54] HOSE COUPLING

[75] Inventor: Heinz Sauer, Ronneburg, Fed. Rep. of Germany

[73] Assignee: Rasmussen GmbH, Maintal, Fed. Rep. of Germany

[21] Appl. No.: 743,603

[22] Filed: Jun. 11, 1985

[30] Foreign Application Priority Data

Jul. 5, 1984 [DE] Fed. Rep. of Germany ....... 3424675

[51] Int. Cl.$^4$ .............................................. F16L 33/23
[52] U.S. Cl. .................................... 285/242; 285/243; 285/256; 285/257; 285/322
[58] Field of Search ............... 285/242, 243, 252, 256, 285/257, 259, 321, 322; 24/274 WB, 20 R, 20 EE, 20 TT

[56] References Cited

U.S. PATENT DOCUMENTS

| 1,971,105 | 8/1934 | Hartman et al. | 285/243 |
| 2,958,549 | 11/1960 | Spafford | 285/243 |
| 3,073,628 | 1/1963 | Cline | 285/243 |
| 3,087,746 | 4/1963 | Hamilton et al. | 285/243 |
| 3,174,777 | 3/1965 | Lodholm et al. | 285/252 |
| 3,266,109 | 8/1966 | Thomas | 24/20 TT |
| 3,300,163 | 1/1967 | Randolph | 285/257 |
| 3,868,130 | 2/1975 | Schwertner et al. | 285/243 |

FOREIGN PATENT DOCUMENTS

| 6516 | 4/1904 | Denmark | 285/243 |
| 277578 | 8/1914 | Fed. Rep. of Germany | 285/243 |
| 13789 | 2/1905 | Norway | 285/243 |
| 2606 | 11/1890 | Sweden | 285/243 |

Primary Examiner—Cornelius J. Husar
Assistant Examiner—Eric Nicholson
Attorney, Agent, or Firm—Peter K. Kontler

[57] ABSTRACT

A hose coupling wherein one terminal portion of the hose surrounds a first circumferentially extending external rib of a nipple. The rib is adjacent to the free end of the nipple and is separated from a second external rib by a cylindrical portion of the nipple. The terminal portion of the hose is surrounded by an annular clamping member which has a circumferentially complete annular portion surrounding the hose and being spaced apart from the nipple as well as several axially parallel elastic prongs which surround the first rib and the cylindrical portion of the nipple and have inwardly extending projections engaging that flank of the second rib which faces away from the first rib. Certain prongs are further provided with teeth which abut against the end face of the terminal portion of the hose. A split ring is received in a composite groove which is provided in the external surfaces of the prongs to bias the prongs against the terminal portion of the hose so that the terminal portion sealingly engages the cylindrical portion of the nipple. The end portions of the split ring are provided with claws which are in engagement with but are separable from each other.

10 Claims, 5 Drawing Figures

HOSE COUPLING

BACKGROUND OF THE INVENTION

The present invention relates to hose couplings in general, and more particularly to improvements in hose couplings of the type disclosed in the commonly owned copending patent application Ser. No. 681,118, filed Dec. 13, 1984 and now abandoned.

The copending application discloses a hose coupling wherein an annular clamping member surrounds that terminal portion of a hose which surrounds a tubular member in the form of a nipple and wherein the clamping member has two normally circumferentially complete annular portions as well as a plurality of elastic prongs which extend between and are integral with the two annular portions. The nipple has a circumferentially complete external deforming rib which is adjacent to its free end portion and is surrounded by the terminal portion of the hose in assembled condition of the coupling. One annular portion of the clamping member then surrounds the hose and is spaced apart from the nipple, and the other annular portion of the clamping member surrounds the terminal portion of the hose and the nipple in a region which is separated from the free end portion of the nipple by the aforementioned rib. The latter has a conical flank which tapers toward the axis of the nipple in a direction toward the free end portion to facilitate the introduction of the nipple into the terminal portion of the hose. The other annular portion of the clamping member is a split ring whose end portions can be secured to each other so that such annular portion bears against the adjacent part of the terminal portion of the hose and urges such part against the periphery of the nipple. The other annular portion is opened preparatory to assembly of the coupling and its end portions are thereupon attached to each other to thus ensure that the prongs bear against the terminal portion of the hose and the terminal portion is less likely to slide off the nipple in response to the application of axial stresses to the nipple and/or hose.

The just discussed hose coupling is quite satisfactory when it is in actual use, i.e., it establishes a reliable seal between the terminal portion of the hose and the nipple and it also offers a rather pronounced resistance to separation of the hose from the nipple. However, the clamping member is rather complex because one of its annular portions must be provided with means for releasably or permanently securing the two end portions to each other upon completed assembly of the coupling. Moreover, the force with which the prongs of the clamping member bear against the exterior of the terminal portion of the hose cannot be varied and depends exclusively on the nature of detent means on the end portions of the other annular portion of the clamping member.

OBJECTS AND SUMMARY OF THE INVENTION

An object of the invention is to provide a novel and improved hose coupling which can utilize a relatively simple and inexpensive clamping member without any reduction of the sealing action and/or resistance to separation of the hose from the tubular member.

Another object of the invention is to provide a hose coupling which can be assembled in a simple and time saving manner without any tools or by utilizing simple and readily available tools.

A further object of the invention is to provide the hose coupling with novel and improved means for reliably biasing the prongs of the clamping member against the terminal portion of the hose in assembled condition of the coupling.

An additional object of the invention is to provide a hose coupling wherein the clamping member and the terminal portion of the hose can be slipped onto the tubular member with a minimum of effort and in a highly predictable way.

Still another object of the invention is to provide the hose coupling with novel and improved means for reliably holding the clamping member in engagement with the exterior of the terminal portion of the hose.

A further object of the invention is to provide a hose coupling wherein the relative axial movement of the clamping member and the hose is terminated in a fully automatic way when the clamping member surrounds an optimum length of the hose preparatory to slipping of the terminal portion of the hose onto the tubular member.

An additional object of the invention is to provide a novel and improved tubular member for use in the above outlined coupling.

Another object of the invention is to provide a novel and improved clamping member for use in the above outlined coupling.

The invention is embodied in a coupling for the terminal portion of a flexible hose, normally an elastically deformable hose which is made of a synthetic plastic material. The coupling comprises a metallic nipple or an analogous rigid tubular member including an end portion, a preferably cylindrical second portion and a circumferentially extending external hose-deforming rib between the two portions. The two portions and the rib of the tubular member are surrounded by the terminal portion of the hose in assembled condition of the coupling and the latter further comprises a tubular clamping member including a circumferentially complete annular portion which surrounds the hose and is spaced apart from the tubular member in assembled condition of the coupling, and a plurality of elongated substantially axially parallel elastic prongs or fingers having first ends integral with the annular portion and free second ends. The prongs are disposed externally of the terminal portion of the hose and are outwardly adjacent to the two portions as well as to the rib of the tubular member, and the clamping member has a composite circumferentially extending recess composed of external sockets provided in at least some of the prongs and surrounding the second portion of the tubular member and the corresponding part of the terminal portion of the hose in assembled condition of the coupling. The latter further comprises a tensioning ring which is received in the recess and serves to press the prongs of the clamping member against the terminal portion of the hose around the second portion of the tubular member.

At least some of the prongs are provided with substantially radially inwardly extending projections in the form of pallets. The end face of the terminal portion of the hose is disposed between such projections and the recess in assembled condition of the coupling. The projections can be disposed at the free second ends of the respective prongs. The tubular member can be provided with a second circumferentially extending external rib which is separated from the deforming rib by the second portion of the tubular member. The second rib has a flank (e.g., a radial flank) which faces away from the second portion of the tubular member and the aforementioned projections of the prongs are then adjacent to the flank of the second rib in assembled condition of the coupling. The second rib preferably further comprises a conical second flank which tapers toward the axis of the tubular member in a direction toward the second portion of the latter. At least some of the prongs can be further provided with teeth which extend radially inwardly and are adjacent to the end face of the terminal portion of the hose in assembled condition of the coupling. Such teeth are then outwardly adjacent to the second portion of the tubular member.

The deforming rib is preferably provided with a substantially cylindrical surface or top land and with two flanks which are disposed at the opposite sides of such cylindrical surface. One of these flanks is preferably a conical flank which tapers toward the axis of the tubular member in a direction toward the end portion.

The outer diameter of the end portion of the tubular member preferably matches or approximates the inner diameter of the hose in undeformed condition of the hose. The outer diameter of the second portion of the tubular member preferably exceeds the outer diameter of the end portion.

The prongs of the clamping member can have identical widths, as considered in the circumferential direction of the clamping member, and they can be equidistant from each other (i.e., the slots between neighboring prongs can have identical widths). Those portions of the prongs which surround the deforming rib bulge radially outwardly and bias the corresponding part of the terminal portion of the hose against the deforming rib in assembled condition of the coupling.

The tensioning ring can constitute a split ring with two end portions which are provided with detent means for releasably holding such end portions in engagement with one another. The detent means can comprise a radially outwardly extending first claw on one end portion of the split ring and a radially inwardly extending second claw which is provided on the other end portion of the split ring and engages the first claw in assembled condition of the coupling.

The novel features which are considered as characteristic of the invention are set forth in particular in the appended claims. The improved hose coupling itself, however, both as to its construction and the mode of assembling the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
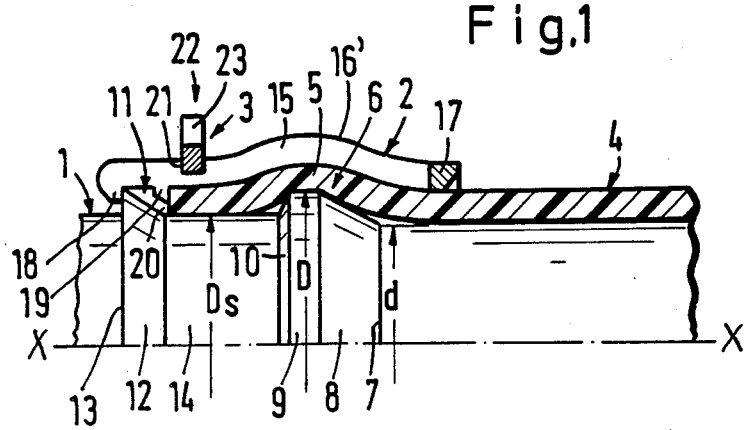
FIG. 1 is a fragmentary partly elevational and partly axial sectional view of a fully assembled hose coupling which embodies one form of the present invention.
Figure 3:
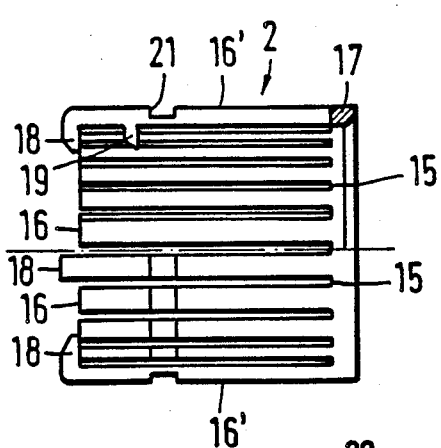
FIG. 3 is a sectional view as seen along the composite line A—A of FIG. 2 in the direction of arrow P.

FIG. 1 shows a portion of a fully assembled hose coupling which embodies one form of the invention. The coupling is designed to maintain one terminal portion 5 of a flexible hose 4 in sealing engagement with a rigid tubular member 1 in the form of a metallic nipple whose free end portion 7 has an outer diameter d matching or closely approximating the inner diameter of the hose 4 in undeformed condition of the latter. The hose 4 can be made of an elastomeric synthetic plastic material, and its terminal portion 5 has a radially extending end face 20. The improved coupling comprises the nipple 1, an annular clamping member 2 and a split tensioning ring 3. The clamping member 2 can be made of an elastomeric synthetic plastic material, and the tensioning ring 3 is made of metal or a suitable synthetic plastic substance.

The nipple 1 has a first circumferentially complete external rib 6 which is adjacent to the free end portion 7 and serves to deform the respective part of the terminal portion 5 of the hose 4 in assembled condition of the coupling. The nipple 1 is further provided with a second circumferentially complete external rib 11 which is separated from the rib 6 by a cylindrical portion 14 of the nipple. The outer diameter $D_S$ of the cylindrical portion 14 at least slightly exceeds the diameter d but is less than the diameter D of the cylindrical surface 9 of the rib 6. Such cylindrical surface is disposed between two conical flanks 8 and 10. The flank 8 tapers rather gradually toward the axis X—X of the nipple 1 in a direction toward the free end portion 7, and the flank 10 has a more pronounced taper and slopes in the opposite direction, i.e., toward the cylindrical portion 14. The rib 11 has a conical flank 12 which tapers toward the axis X—X in a direction toward the cylindrical portion 14 and a substantially or exactly radial flank 13 which faces away from the rib 6. The taper of the flank 12 can match or approximate the taper of the flank 8 and can be in the range of 20°. The flank 8 can terminate at the free end portion 7 of the nipple 1. The maximum diameter of the rib 11 can match or closely approximate the diameter D of the cylindrical surface 9 of the rib 6.

The clamping member 2 has a circumferentially complete one-piece annular portion 17 which is spaced apart from the free end portion 7 of the nipple 1 and surrounds the hose 4 in assembled condition of the coupling. The clamping member 2 further comprises a substantial number of axially parallel elongated elastic prongs or fingers 16 each of which has a first end which is integral with the annular portion 17 and a free second end outwardly adjacent to the rib 11 of the nipple 1. The prongs 16 are separated from each other by slots 15 of identical width, as considered in the circumferential direction of the clamping member 2. Furthermore, the width of each prong 16 is preferably the same. The total number of prongs 16 on the illustrated clamping member 2 is twentyfour, and four of these prongs (denoted by the characters 16′) have radially inwardly extending projections 18 in the form of pallets which are disposed at their free ends and engage the radial flank 13 of the rib 11 to thus hold the clamping member 2 against axial movement in a direction to the right, as viewed in FIG. 1. The prongs 16′ are equidistant from each other, as considered in the circumferential direction of the clamping member 2, and each of these prongs further comprises a second projection in the form of a radially inwardly extending tooth 19 which is adjacent to the end face 20 of the terminal portion 5 of the hose 4. The teeth 19 determine the extent to which the clamping member 2 can be slipped onto the hose 4 prior to insertion of the nipple 1 into the terminal portion 5.

The clamping member 2 is further formed with a composite recess or groove composed of a total of twenty-four discrete sockets 21 machined into or otherwise provided in the external surfaces of the prongs 16 and serving to receive the tensioning ring 3. The groove or recess including the sockets 21 surrounds the cylindrical portion 14 of the nipple 1 in assembled condition of the hose coupling.

Figure 5:
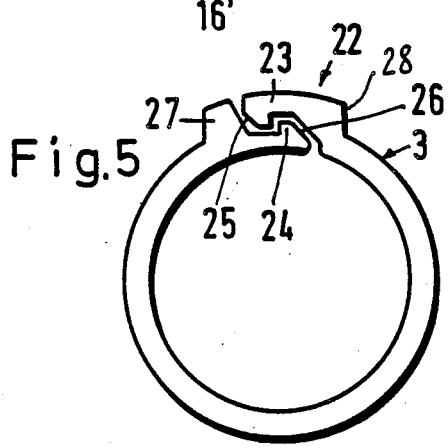
FIG. 5 is a side elevational view of the ring-shaped tensioning member which forms part of the improved hose coupling.
Figure 4:
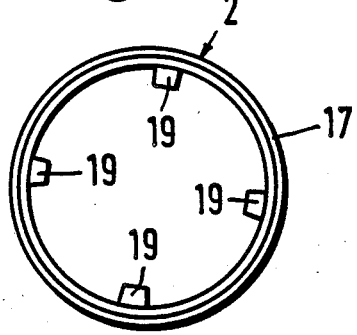
FIG. 4 is a rear end view of the annular coupling member.

The tensioning member 3 is a split ring whose end portions are provided with detent means 22 for releasably holding such end portions in engagement with each other and for thereby biasing the adjacent portions of the prongs 16 against the corresponding part of the terminal portion 5. As can be seen in FIG. 5, the detent means 22 comprises a radially inwardly extending claw 23 on one end portion of the tensioning member 3 and a radially outwardly extending claw 24 on the other end portion of the member 3. The claw 24 has a cam face 26 which can be engaged by a complementary cam face 25 of the claw 23 when the two claws are moved into engagement with each other as a result of a reduction of the diameter of the tensioning member 3. The claw 24 is adjacent to a protuberance 27 which extends radially outwardly and which can be engaged by a finger simultaneously with engagement of another finger with a shoulder 28 of the claw 23 to thus facilitate the movement of the claws 23, 24 into engagement with each other. Alternatively, the protuberance 27 and the shoulder 28 can be engaged by a suitable tool, e.g., by the jaws of pliers, to effect a movement of the cam face 25 along the cam face 26 and to thereby engage the claw 23 with the claw 24. When the tensioning member 3 is properly applied around the prongs 16 of the clamping member 2, the radially inwardly extending claw 23 of the detent means 22 extends into the tooth space between the claw 24 and the protuberance 27. The tensioning member 3 can be disengaged from the clamping member 2 by moving the claw 23 radially outwardly (e.g., by means of pliers) so that it becomes disengaged from the claw 24.

The improved hose coupling is assembled as follows:

The tensioning ring 3 is slipped onto the nipple 1 while the claws 23 and 24 are disengaged from each other, and such ring is then located to the left of the rib 11, as viewed in FIG. 1. In the next step, the annular portion 17 of the clamping member 2 is slipped over and beyond the terminal portion 5 of the hose 4 until the teeth 19 engage the end face 20. This determines the maximum extent to which the terminal portion 5 can be received in the clamping member 2. In a further step, the clamping member 2 and the terminal portion 5 of the hose 4 are jointly slipped onto the nipple 1 so that the terminal portion 5 surrounds the rib 6 as well as the major part of the cylindrical portion 14. The free end portions of the prongs 16 are slipped over the rib 11 and the projections 18 move radially inwardly due to innate resiliency of the respective prongs 16' as soon as they advance beyond the radial flank 13 of the rib 11. This completes the assembly of the terminal portion 5 and clamping member 2 with the nipple 1. In the final step, the still open (expanded) tensioning ring 3 is slid onto the adjacent free end portions of the prongs 16 and enters the recess including the sockets 21 before the claws 23 and 24 are caused to engage with each other to thus complete the assembly of the hose coupling.

The elastic prongs 16 are flexed in the region of the rib 6 and urge the adjacent part of the terminal portion 5 against the cylindrical surface 9 of the rib 6 so as to ensure the establishment of a highly satisfactory sealing action between the hose 4 and the nipple 1. An additional seal is established between that part of the terminal portion 5 which extends beyond the rib 6 and the cylindrical portion 14 of the nipple 1. This is due to the provision of the tensioning ring 3 which urges the adjacent portions of the prongs 16 against the terminal portion 5 whereby the latter is urged against the external surface of the cylindrical portion 14. The elasticity of the prongs 16 suffices to compensate for thermally induced expansion or contraction of the terminal portion 5 and/or nipple 1. The tensioning ring 3 prevents any radial expansion of the prongs 16 in the region of the sockets 21 so that the left-hand end portion of the clamping member 2 (as viewed in FIG. 1) can be said to constitute a circumferentially complete annulus which prevents radial expansion of the corresponding part of the terminal portion 5 and thus eliminates the likelihood of slippage of the terminal portion 5 relative to the nipple 1 in a direction to separate the hose 4 from the nipple. The clamping member 2 is preferably constructed in such a way that the elasticity of its annular portion 17 is negligible or nil, i.e., that the diameter of the annular portion 17 cannot increase or increases only negligibly when the hose coupling is assembled. This reduces the likelihood of leakage of confined fluid between the nipple 1 and the terminal portion 5 when the hose 4 is flexed in the region of the free end portion 7 of the nipple. The likelihood of leakage of confined fluid medium is further reduced due to the fact that the annular portion 17 of the clamping member 2 is located to the right of the free end portion 7 of the nipple 1, as viewed in FIG. 1. The projections 18 bear against the radial flank 13 of the rib 11 and prevent separation of the clamping member 2 from the nipple 1 in assembled condition of the coupling, and this also prevents separation of the terminal portion 5 from the nipple 1 because the tensioning member 3 biases the respective portions of the prongs 16 against the terminal portion 5 which is thereby biased against the cylindrical external surface of the portion 14.

The second rib 11 and the projections 18 of the prongs 16' can be omitted if the improved hose coupling is to be used under circumstances when the hose 4 is not likely to be subjected to pronounced axial stresses which would tend to cause the terminal portion 5 to slip off the nipple 1. The teeth 19 are then disposed at the free ends of the respective prongs 16' and the remaining prongs 16 need not extend beyond the teeth 19.

Figure 2:
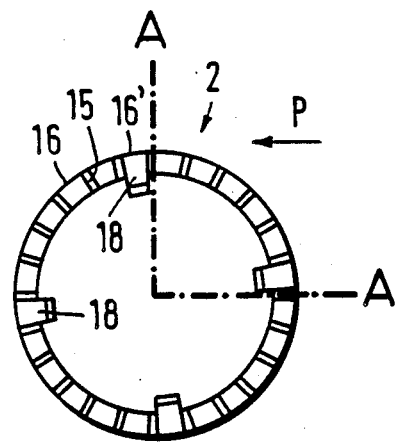
FIG. 2 is a front end view of the annular clamping member which forms part of the improved hose coupling.

An important advantage of the improved hose coupling is that the prongs 16 are integral only with the annular portion 17 of the clamping member 2, i.e., that the slots 15 extend all the way to the free left-hand ends of the prongs 16, as viewed in FIGS. 1 and 2. This facilitates the slipping of the clamping member 2 onto the terminal portion 5 as well as the insertion of the nipple 1 into the terminal portion 5 while the latter is already surrounded by the prongs 16.

Another important advantage of the improved hose coupling is that the tensioning ring 3 constitutes a discrete part. This renders it possible to select any one of several tensioning rings for insertion into the groove or recess including the sockets 21, depending on the desired extent to which the prongs 16 should bear against the terminal portion 5 in the region of the cylindrical portion 14 of the nipple 1.

Since the tensioning ring 3 is a discrete part of the improved hose coupling, the free end portions of the prongs 16 can expand as much as necessary in order to facilitate the insertion of the nipple 1 into the terminal portion 5 of the hose 4 subsequent to insertion of the terminal portion 5 into the clamping member 2 to the extent which is determined by the teeth 19 of the prongs 16'. The prongs 16 can begin to spread all the way from the annular portion 17 of the clamping member 2 so that the insertion of the terminal portion 5 into the member 2 presents no problems and necessitates the application of a negligible force. The dimensions of the tensioning ring 3 (when the claws 23 and 24 are in proper engagement with each other) can be readily selected in such a way that the adjacent portions of the prongs 16 offer a pronounced resistance to axial movement of the terminal portion 5 relative to the nipple 1 and/or vice versa.

The teeth 19 constitute a desirable and advantageous feature of the improved hose coupling because they ensure that an optimum length of the hose 4 can be inserted into the clamping member 2 before the parts 2 and 5 are jointly slipped onto the nipple 1. Were the portion of the hose 4 in the clamping member 2 too short, the elasticity of the prongs 16 could not be utilized to maximum advantage. On the other hand, if the terminal portion 5 were permitted to penetrate into the clamping member 2 beyond the position which is shown in FIG. 1, the axial position of the clamping member with reference to the nipple 1 could not be selected in an optimum way, i.e., the annular portion 17 would be too close to or too far away from the free end portion 7 of the nipple 1 and the tensioning ring 3 could not bias the adjacent portions of the prongs 16 against that part of the terminal portion 5 which is closely adjacent to the end face 20. It has been found that the bias of the outwardly bulging portions of the prongs 16 upon that part of the terminal portion 5 which surrounds the rib 6 is most satisfactory if the tensioning ring 3 is disposed between the ribs 6 and 11 and is nearer to the rib 11. The placing of the projections 18 and teeth 19 close to the free ends of the prongs 16 is desirable and advantageous because this ensures that each and every prong can bear, in its entirety, against the adjacent part of the external surface of the terminal portion 5 in order to bias the latter against the rib 6 as well as against the external surface of the cylindrical portion 14 of the nipple 1.

The second rib 11 constitutes an optional but highly desirable feature of the nipple 1 because it can be engaged by the projections 18 of the prongs 16' to thus even further reduce the likelihood of axial movement of the clamping member 2 and terminal portion 5 relative to the nipple 1 in a direction to separate the hose 4 from the nipple.

An advantage of the cylindrical surface 9 of the rib 6 is that it promotes the establishment of a reliable seal between the nipple 1 and the terminal portion 5 because the latter is held in a substantial surface-to-surface (rather than in mere linear) contact with the rib 6.

The aforediscussed selection of the diameters d, D and $D_S$ has been found to facilitate the insertion of the nipple 1 into the terminal portion 5 of the hose 4 as well as reliable retention of the hose 4 and nipple 1 against axial movement relative to each other. Moreover, the aforediscussed selection of the diameter $D_S$ ensures that the tensioning ring 3 can bias the adjacent portions of the prongs 16 against the terminal portion 5 with a substantial force so that the terminal portion 5 is in large surface-to-surface contact with the cylindrical portion 14 of the nipple 1.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A coupling for one terminal portion of a flexible hose whose terminal portion has an end face, comprising a tubular member including an end portion, a second portion, a circumferentially extending external deforming rib for deforming the hose, located between said end and second portions and a second circumferentially extending external rib, said second portion being disposed between said ribs and said second rib having a first flank facing away from said deforming rib and a conical second flank which tapers toward the axis of said tubular member in a direction toward said end portion, said end and second portions and said deforming rib of said tubular member being surrounded by the terminal portion of the hose in the assembled condition of the coupling; a tubular clamping member including a circumferentially complete annular portion surrounding the hose and radially spaced apart from said tubular member in assembled condition of the coupling, and a plurality of elongated substantially axially parallel elastic prongs having first ends integral with said annular portion and free second ends, said prongs being radially external to the terminal portion of the hose and radially outwardly overlying said end and second portions and said deforming rib of said tubular member in assembled condition of the coupling, at least some of said prongs having radially inwardly extending projections adjacent to said first flank in assembled condition of the coupling and at least some of said prongs further having teeth extending radially inwardly and being adjacent to the end face of the terminal portion of the hose in assembled condition of the coupling, said teeth being outwardly adjacent to the second rib of said tubular member, said clamping member having a composite circumferentially extending recess formed by external sockets provided in said prongs and surrounding the second portion of said tubular member and the terminal portion of the hose in assembled condition of the coupling, the end face of the terminal portion of the hose being disposed between said projections and said recess, as seen in the axial direction of said tubular member, in assembled condition of the coupling; and a compressing ring received in said recess and arranged to press said prongs against the terminal portion of the hose.

2. The coupling of claim 1, wherein said projections are disposed at the free second ends of the respective prongs.

3. The coupling of claim 1, wherein said deforming rib has a substantially cylindrical surface and two flanks disposed at the opposite axial ends of such cylindrical surface.

4. The coupling of claim 1 for one terminal portion of a hose having a predetermined inner diameter in the undeformed condition thereof, wherein the end portion of said tubular member has an outer diameter which matches or closely approximates said predetermined diameter.

5. The coupling of claim 4, wherein the outer diameter of the second portion of said tubular member exceeds said predetermined diameter.

6. The coupling of claim 1, wherein said prongs have identical widths, as considered in the circumferential direction of said clamping member, and are equidistant from each other.

7. The coupling of claim 1, wherein said prongs have portions which surround said deforming rib and bulge radially outwardly in assembled condition of the coupling to bias the corresponding part of the terminal portion of the hose against said deforming rib.

8. The coupling of claim 1, wherein said compressing ring is a split ring having two end portions provided with detent means for releasably holding such end portions of the compressing ring in engagement with one another.

9. The coupling of claim 8, wherein said detent means comprises a radially outwardly extending first claw provided on one end portion of said split ring and a radially inwardly extending second claw provided on the other end portion of said split ring, and engaging said first claw in assembled condition of the coupling.

10. The coupling of claim 1, wherein said tubular member includes a metallic nipple.

* * * * *